(12) United States Patent
Minamoto et al.

(10) Patent No.: US 11,370,053 B2
(45) Date of Patent: Jun. 28, 2022

(54) WELDING TORCH AND WELDING TORCH COOLING SYSTEM

(71) Applicant: DAIHEN CORPORATION, Osaka (JP)

(72) Inventors: Tetsushi Minamoto, Osaka (JP); Yukiya Morita, Osaka (JP); Yoshiaki Fukunaga, Osaka (JP)

(73) Assignee: DAIHEN Corporation, Osaka (JP)

( * ) Notice: Subject to any disclaimer, the term of this patent is extended or adjusted under 35 U.S.C. 154(b) by 359 days.

(21) Appl. No.: 16/620,259

(22) PCT Filed: May 10, 2018

(86) PCT No.: PCT/JP2018/018162
§ 371 (c)(1),
(2) Date: Dec. 6, 2019

(87) PCT Pub. No.: WO2018/230209
PCT Pub. Date: Dec. 20, 2018

(65) Prior Publication Data
US 2020/0094344 A1      Mar. 26, 2020

(30) Foreign Application Priority Data
Jun. 15, 2017   (JP) .............................. JP2017-117844

(51) Int. Cl.
*B23K 9/28*      (2006.01)

(52) U.S. Cl.
CPC .................... *B23K 9/285* (2013.01)

(58) Field of Classification Search
CPC ........ B23K 37/003; B23K 9/285; B23K 9/29; B23K 9/32; B23K 9/323
(Continued)

(56) References Cited

U.S. PATENT DOCUMENTS 4,508,951 A * 4/1985 Rehrig, Jr. ............. B23K 9/285
219/136
4,582,979 A   4/1986 Moerke
(Continued)

FOREIGN PATENT DOCUMENTS

CN      103009495 A    4/2013
CN      205822349 U   12/2016
(Continued)

OTHER PUBLICATIONS

Office Action issued in the corresponding Chinese Patent application, dated Mar. 22, 2021, and corresponding English translation (11 pages).
(Continued)

*Primary Examiner* — Dana Ross
*Assistant Examiner* — James F Sims, III
(74) *Attorney, Agent, or Firm* — Hamre, Schumann, Mueller & Larson, P.C.

(57) ABSTRACT

An aspect of the present disclosure provides a welding torch that includes a torch head and a torch body removably connected to the torch head. The torch head includes first and second torch-head flow paths for flowing cooling water, first and second inlets/outlets communicating with the first and second torch-head flow paths, respectively, and a movable part movable in an axial direction of the torch head. The torch body includes a torch-body flow path for flowing cooling water, and first and second connection ports communicating with opposite ends of the torch-body flow path, respectively. The first and second inlets/outlets communicate with the first and second connection ports, respectively, when the torch head and the torch body are connected to each other. The first and second inlets/outlets are closed with the movable part when the torch head and the torch body are separated.

7 Claims, 4 Drawing Sheets

(58) Field of Classification Search
USPC .................................................. 219/137.62
See application file for complete search history.

(56) References Cited

U.S. PATENT DOCUMENTS

| | | |
|---|---|---|
| 9,533,369 B2 | 1/2017 | Oberndorfer et al. |
| 2015/0114943 A1 | 4/2015 | Oberndorfer et al. |

FOREIGN PATENT DOCUMENTS

| | | |
|---|---|---|
| DE | 22 43 924 A1 | 3/1974 |
| DE | 42 29 227 C1 | 9/1993 |
| GB | 1 403 225 A | 8/1975 |
| JP | 57-68279 A | 4/1986 |
| JP | 9-99367 A | 4/1997 |
| JP | 2000-135565 A | 5/2000 |
| JP | 2009-269049 A | 11/2009 |

OTHER PUBLICATIONS

Search Report received in the corresponding European Patent application, dated Feb. 24, 2021 (7 pages).
International Search Report issued in PCT/JP2018/018162, dated Aug. 14, 2018 (1 page).

\* cited by examiner

WELDING TORCH AND WELDING TORCH COOLING SYSTEM

TECHNICAL FIELD

The present disclosure relates to a welding torch and a welding torch cooling system.

BACKGROUND ART

Automatic welding using a welding robot or a traveling carriage, or semi-automatic welding performed by an operator is employed in consumable electrode arc welding, for example. During the welding work in such automatic welding, for example, a welding wire is fed from a wire feeder to a welding torch, and electric power is supplied to the welding torch.

A water-cooled type welding torch is known as a welding torch used for such welding work. In a water-cooled type welding torch, cooling water supplied from a cooling water circulator circulates through the welding torch. A welding torch used for semi-automatic welding may typically include a torch head, to which a torch body is connected. In a water-cooled type welding torch, the power cable extending to the welding torch is cooled, and also, the torch head, which the operator holds with a hand, or the torch body, in which a power supply chip is mounted, are prevented from being excessively heated.

In such a water-cooled type welding torch, the maintenance work such as replacing a consumable part in a tip of a torch involves stopping the operation of the cooling water circulator and separating the torch body from the torch head. At this time, water may adhere to the welding wire if the cooling water remaining in the cooling water flow path leaks from the connection between the torch body and the torch head. Also, when the torch body is separated without turning off the stop switch of the cooling water circulator by mistake, cooling water spouts from the tip of the torch head to adhere to the welding wire. Water adhesion to the welding wire causes a welding failure.

SUMMARY OF THE INVENTION

An object of the present disclosure is to provide a more suitable welding torch. For example, an object of the present disclosure is to provide a welding torch suitable for improving the efficiency of the work for replacing a torch body in a water-cooled type welding torch, for example, According to a first aspect of the present disclosure, a welding torch is provided. The welding torch includes a torch head and a torch body removably connected to the torch head. The torch head includes a first torch-head flow path and a second torch-head flow path for flowing cooling water, a first inlet/outlet and a second inlet/outlet communicating with the first torch-head flow path and the second torch-head flow path, respectively, and a movable part that is movable in an axial direction of the torch head. The torch body includes a torch-body flow path for flowing cooling water, and a first connection port and a second connection port communicating with opposite ends of the torch-body flow path, respectively. The first inlet/outlet and the second inlet/outlet communicate with the first connection port and the second connection port, respectively, when the torch head and the torch body are connected to each other. The first inlet/outlet and the second inlet/outlet are closed with the movable part when the torch head and the torch body are separated.

According to a second aspect of the present disclosure, there is provided a welding torch cooling system. The welding torch cooling system includes a welding torch according to the first aspect of the present disclosure, a cooling water circulator, a water feeding flow path, a water returning flow path, a bypass flow path, a valve, a pressure measurer, and a controller. The cooling water circulator circulates cooling water through the welding torch. The water feeding flow path has an upstream end connected to the cooling water circulator and a downstream end connected to the first torch-head flow path. The water returning flow path has an upstream end connected to the second torch-head flow path and a downstream end connected to the cooling water circulator. The bypass flow path has a first end and a second end. The first end is connected to a branching point of the water feeding flow path, and the second end is connected to a merging point of the water returning flow path. The valve is provided in the bypass flow path and switchable between an on open state and a closed state. The pressure measurer is provided in the water feeding flow path at a position downstream of the branching point. The controller controls operation of at least one of the cooling water circulator and the valve based on a measured value at the pressure measurer.

Other features and advantages of the present disclosure will become apparent from the detailed description given below with reference to the accompanying drawings.

MODE FOR CARRYING OUT THE INVENTION

Preferred embodiments of the present disclosure are described below with reference to the accompanying drawings.

Figure 1:
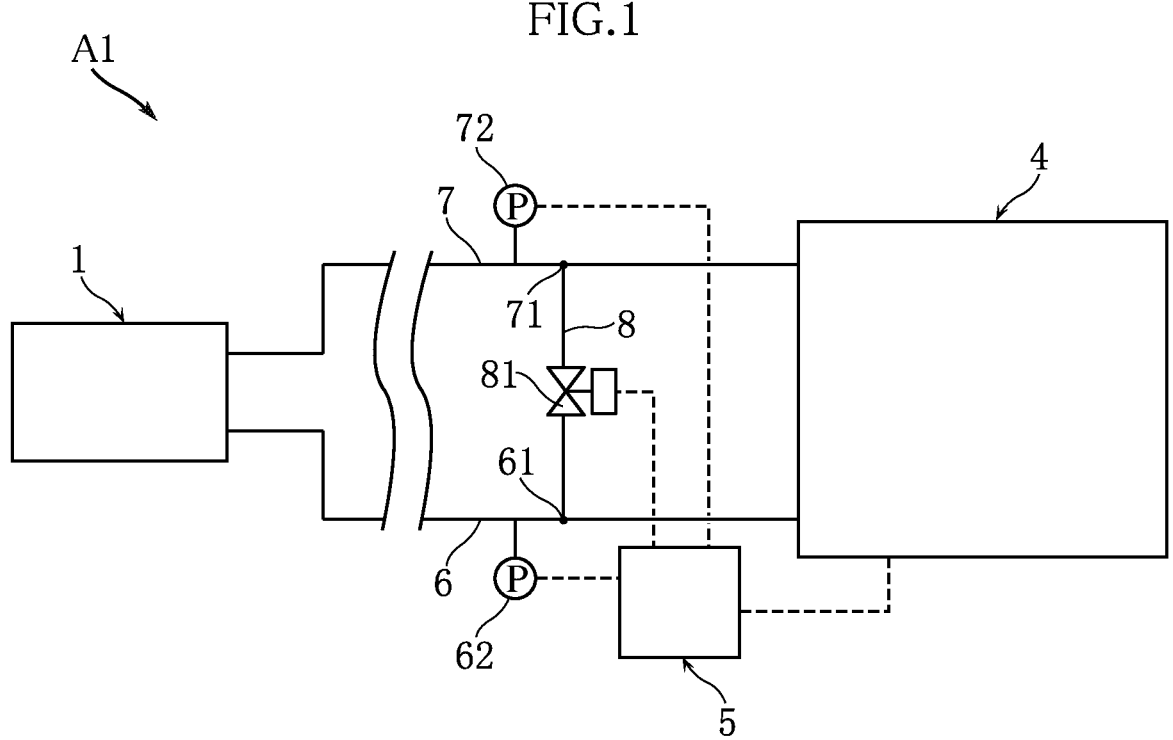
FIG. 1 is a schematic configuration diagram showing an example of a welding torch cooling system according to the present disclosure.

FIG. 1 is a schematic configuration diagram showing an example of a welding torch cooling system according to the present disclosure. The welding torch cooling system A1 according to the present embodiment includes a welding torch 1, a cooling water circulator 4, a controller 5, a water feeding flow path 6, a water returning flow path 7 and a bypass flow path 8. The welding torch 1 according to the present embodiment is a water-cooled type torch and is internally formed with a flow path for flowing cooling water, which will be described later.

The welding torch 1 is incorporated in an arc processing system and used for welding work such as consumable electrode arc welding. In the arc processing system, a welding wire may be supplied to the welding torch 1 by a wire feeding device using a power cable (both not shown). The welding wire is then fed toward a power supply chip provided in the tip of the welding torch 1 and then guided to the outside through the opening in the tip of the welding torch 1. Also, electric power is supplied from a power supply (not shown) to the welding torch 1 via the power cable, and the electric power is supplied to the welding wire via the power supply chip in the welding torch 1.

Figure 2:
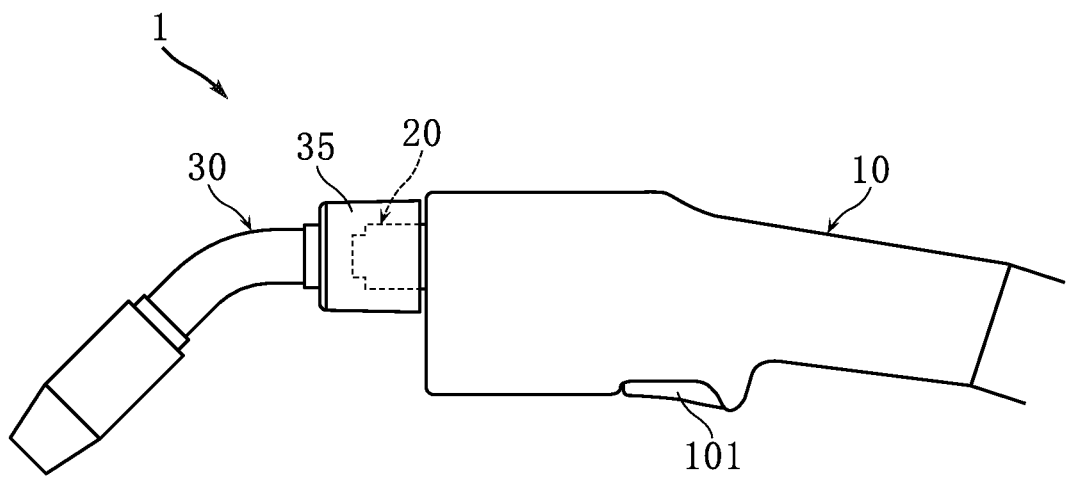
FIG. 2 is a front view showing an example of a welding torch according to the present disclosure.

The welding torch 1 illustrated in FIG. 2 is an example of configuration used for semi-automatic welding. The welding torch 1 includes a handle 10, a torch head 20 and a torch body 30. The handle 10 is a portion for an operator to grip and is cylindrical. The handle 10 has a base end (right side in FIG. 2) to which the above-described power cable is connected. The handle 10 is provided with switch 101 at an appropriate portion. To perform arc welding, the operator turns on the switch 101 while holding the handle 10. This causes welding current to be supplied to the welding wire inserted in the welding torch 1, allowing the welding wire to be fed toward a treatment object. The torch body 30 is removably connected to the torch head 20, which will be described later.

Figure 3:
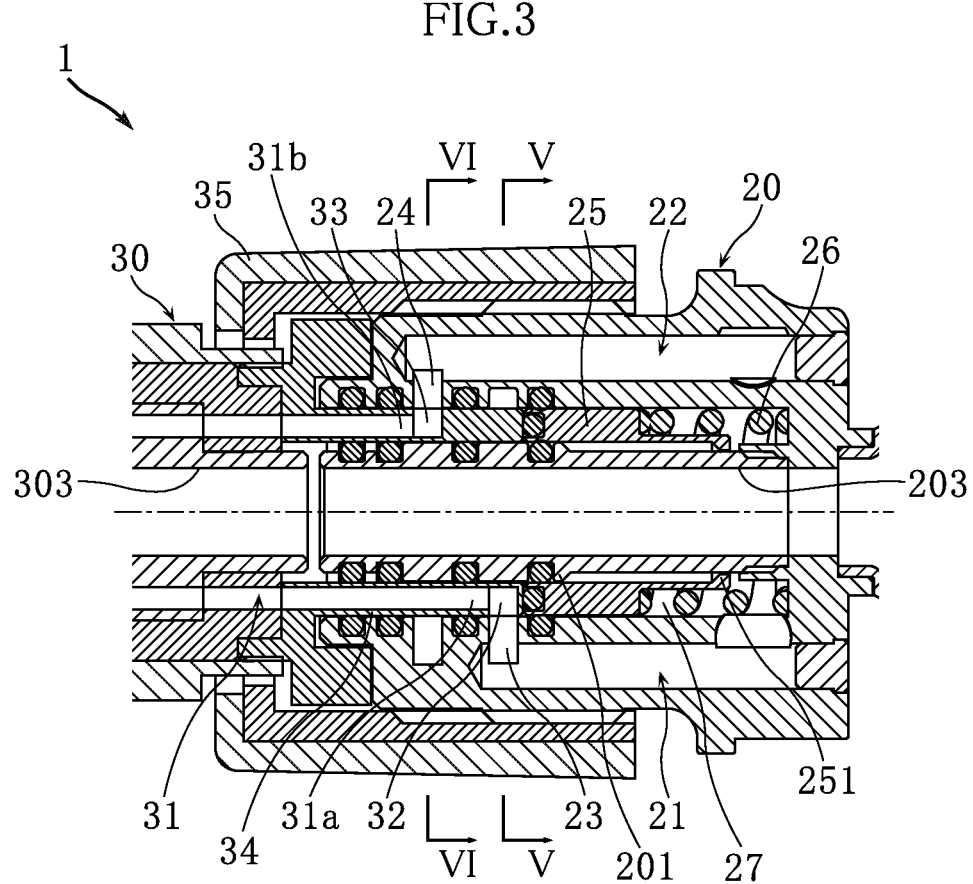
FIG. 3 is an enlarged longitudinal sectional view of a part of the welding torch shown in FIG. 2.

The torch head 20 is provided at the tip of the handle 10 and cylindrical. As shown in FIG. 3, the torch head 20 has a first torch-head flow path 21, a second torch-head flow path 22, a first inlet/outlet 23, a second inlet/outlet 24, a movable part 25 and a biasing member 26.

Figure 5:
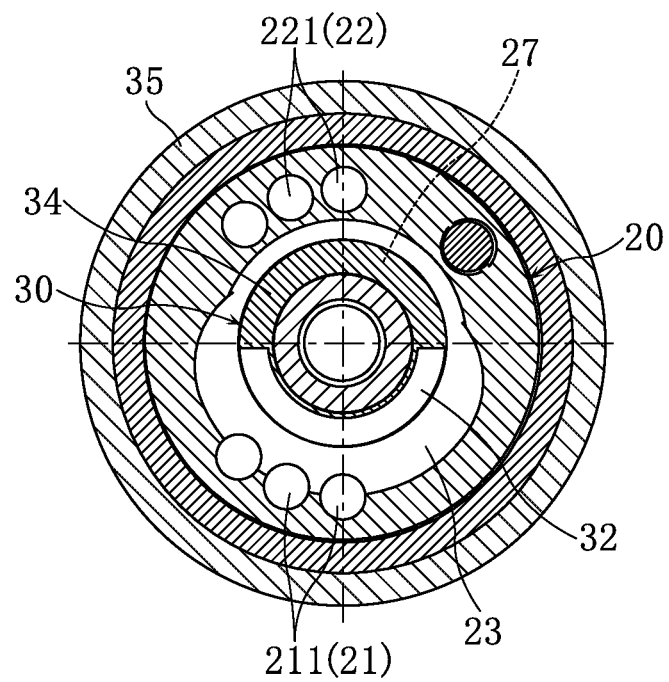
FIG. 5 is a sectional view taken along line V-V in FIG. 3.
Figure 6:
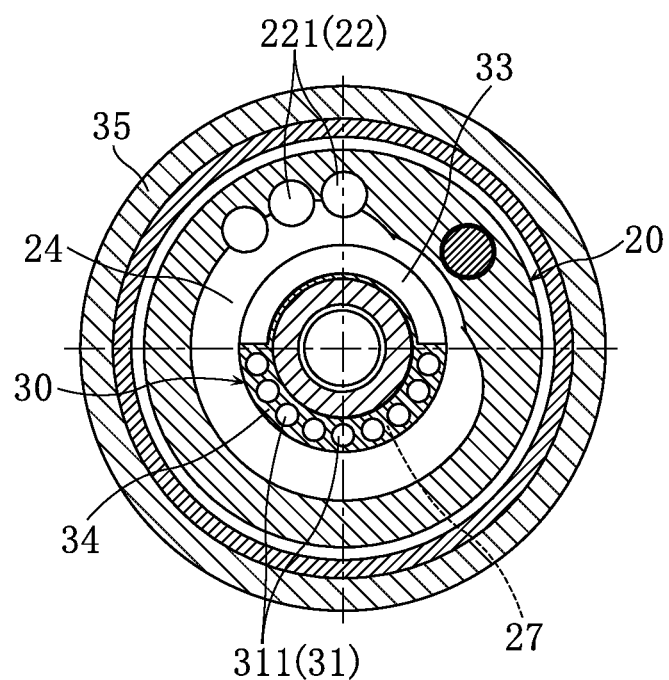
FIG. 6 is a sectional view taken along line VI-VI in FIG. 3.

The first torch-head flow path 21 is a flow path for flowing the cooling water sent out from the cooling water circulator 4. The second torch-head flow path 22 is a flow path for flowing the cooling water that has passed through the torch body 30 described later. As shown in FIGS. 5 and 6, in the present embodiment, the first torch-head flow path 21 and the second torch-head f low paths 22 include a plurality of branch paths 211 and a plurality of branch paths 221, respectively, which extend in the axial direction of the torch head 20.

The first inlet/outlet 23 and the second inlet/outlet 24 communicate with the first torch-head flow path 21 and the second torch-head flow path 22, respectively. The first inlet/outlet 23 and the second inlet/outlet 24 are formed at positions spaced apart from each other by a predetermined distance in the axial direction of the torch head 20. The second inlet/outlet 24 is closer to the tip of the torch head 20 than is the first inlet/outlet 23. The torch head 20 is formed with a cylindrical space 27 radially inward of the first and the second torch-head flow paths 21 and 22. The first inlet/outlet 23 and the second inlet/outlet 24 communicate with the cylindrical space 27 and each have an annular shape around the axis of the torch head 20.

The movable part 25 is a cylindrical member and housed in the cylindrical space 27. The movable part 25 is movable in the axial direction of the torch head 20. The biasing member 26 is housed in the cylindrical space 27 and held in contact with the movable part 25. The biasing member 26 applies a biasing force in the axial direction of the torch head 20 (leftward in FIG. 3) and may be a compression spring, for example.

Figure 4:
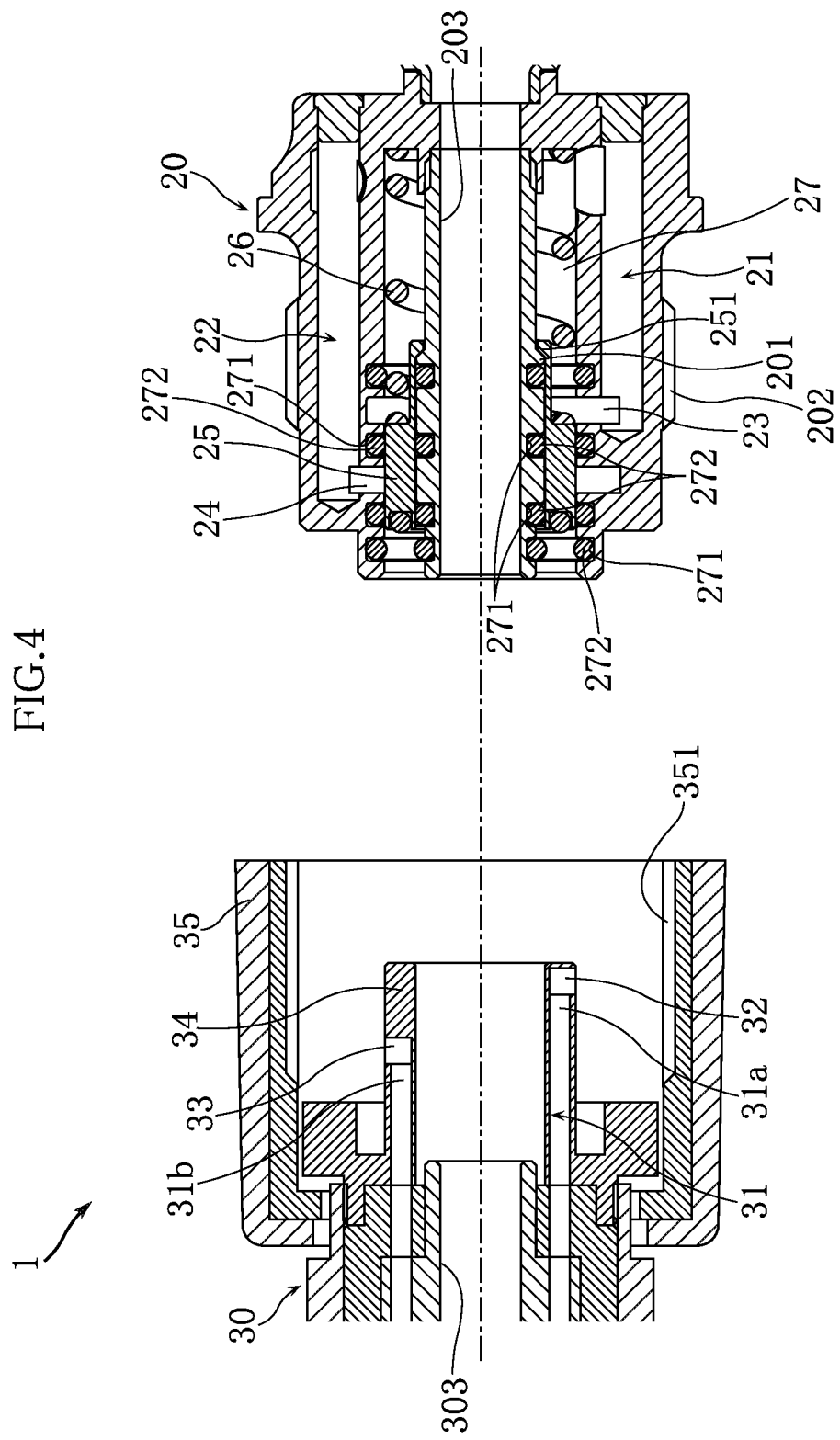
FIG. 4 is a sectional view corresponding to FIG. 3, showing the state in which a torch body is separated from a torch head.

FIG. 4 shows the state in which the torch body 30 is separated from the torch head 20. In this state, the movable part 25 is at a position displaced toward the tip of the torch head 20 (second position), closing the first inlet/outlet 23 and the second inlet/outlet 24. The torch head 20 is formed with a plurality of annular grooves 271 facing the cylindrical space 27 at appropriate positions, and an O-ring 272 is fitted in each of the annular grooves 271. With such an arrangement, when the torch head 20 and the torch body 30 are separated, water is stopped at the respective tips of the first torch-head flow path 21 and the second torch-head flow path 22 (the first inlet/outlet 23 and the second inlet/outlet 24), so that cooling water is prevented from leaking through the tip of the torch head 20. In the state shown in FIG. 4, an engagement target part 251 formed at the movable part 25 is engaged by an engagement part 201 formed in the torch, so that movement of the movable part 25 toward the tip of the torch head 20 (leftward in the figure) is prevented.

The torch body 30 is cylindrical and may be made up of a plurality of cylindrical members joined together by appropriate means such as brazing, press fitting or screwing. The torch body 30 has a torch-body flow path 31, a first connection port 32 and a second connection port 33.

The torch-body flow path 31 is a flow path for flowing cooling water in the torch body 30. Though detailed illustration is omitted, the torch-body flow path 31 extends from the base end (right end in FIG. 3) toward the tip (left side in the figure) of the torch body 30 and turns back in the middle to return to the base end. As shown in FIG. 6, in the present embodiment, the torch-body flow path 31 is includes a plurality of branch paths 311 extending in the axial direction of the torch body 30.

In the present embodiment, the torch body 30 has a base-end cylindrical part 34. The base-end cylindrical part 34 is a portion that may be fitted in the cylindrical space 27 of the torch head 20.

The first connection port 32 communicates with an upstream end 31*a* of the torch-body flow path 31. The second connection port 33 communicates with a downstream end 31*b* of the torch-body flow path 31. The upstream end 31*a* and the downstream end 31*b* of the torch-body flow path 31 are formed in the base-end cylindrical part 34. The upstream end 31*a* and the downstream end 31*b* are located opposite to each other with respect to the central axis of the torch body 30. The first connection port 32 and the second connection port 33 are formed at positions spaced apart from each other by a predetermined distance in the axial direction of the torch body 30. The first connection port 32 and the second connection port 33 each open radially outward of the base-end cylindrical part 34. The first connection port 32 and the second connection port 33 each have an arcuate shape around the axis of the torch body 30.

The first connection port 32 and the second connection port 33 are at positions corresponding to the first inlet/outlet 23 and the second inlet/outlet 24, respectively, in an axial direction. The distance between the first connection port 32 and the second connection port 33 in the above axial direction is substantially equal to the distance between the first inlet/outlet 23 and the second inlet/outlet 24 in the above axial direction.

In the present embodiment, connection of the torch head 20 and the torch body 30 is performed using a union nut 35. The union nut 35 is loosely fitted to the outer periphery of the torch body 30 at a portion close to the base end. To connect the torch body 30 to the torch head 20, the female thread 351 of the union nut 35 is screwed onto the male thread 202 formed on the outer periphery of the torch head 20. In this way, the torch head 20 and the torch body 30 are connected to each other, as shown in FIG. 3.

In the state in which the torch body 30 is connected to the torch head 20, the movable part 25 of the torch head 20 is at a position (first position) pushed deep into the torch head 20 by the tip of the torch body 30 against the biasing force of the biasing member 26. The movable part 25 is movable between the position shown in FIG. 3 (first position) and the position shown in FIG. 4 (second position).

Also, as shown in FIG. 3, when the torch head 20 and the torch body 30 are connected to each other, the first inlet/outlet 23 and the second inlet/outlet 24 of the torch head 20 communicate with the first connection port 32 and the second connection port 33 of the torch body 30, respectively. Thus, when the torch head 20 and the torch body 30 are connected, the cooling water sent out from the cooling water circulator 4 passes through the welding torch 1 by flowing in the first torch-head flow path 21, the torch-body flow path 31 and the second torch-head flow path 22 in the mentioned order.

Note that a cylindrical liner (not shown) in which a welding wire (not shown) may be inserted is disposed in the through-hole 203 at the center of the torch head 20 and the through-hole 303 at the center of the torch body 30.

Returning to FIG. 1, the cooling water circulator 4 serves to circulate cooling water through the welding torch 1. The cooling water circulator 4 is provided with a tank, a pump and a cooler (all not shown). The tank is a container for storing cooling water. The pump serves to force cooling water to flow toward the welding torch 1. The cooler serves to cool the cooling water returning from the welding torch 1 (the cooling water heated by passing through the welding torch 1) and may be a heat exchanger such as a radiator, for example.

The water feeding flow path 6 is a flow path for feeding the cooling water pumped out of the cooling water circulator 4 to the welding torch 1. The water feeding flow path 6 has an upstream end connected to the cooling water circulator 4 and a downstream end connected to the first torch-head flow path 21 of the welding torch 1 (torch head 20).

The water returning flow path 7 is a flow path for returning the cooling water flowing through the welding torch 1 to the cooling water circulator 4. The water returning flow path 7 has an upstream end connected to the second torch-head flow path 22 of the welding torch 1 (torch head 20) and a downstream end connected to the cooling water circulator 4.

The bypass flow path 8 is a flow path for returning the cooling water pumped out of the cooling water circulator 4 to the cooling water circulator 4 without feeding to the welding torch 1. One end of the bypass flow path 8 is connected to a branching point 61 of the water feeding flow path 6, whereas the other end of the bypass flow path is connected to a merging point 71 of the water returning flow path 7. The bypass flow path 8 is provided with a valve 81 that is switchable between an open state and a closed state. The water feeding flow path 6, the water returning flow path 7, and the bypass flow path 8 described above may be provided by a pressure resistant hose.

In the present embodiment, the water feeding flow path 6 is provided with a pressure measurer 62. The pressure measurer 62 is a pressure gauge for measuring the pressure inside the water feeding flow path 6 and located downstream from the branching point 61 of the water feeding flow path 6 (i.e., offset from the branching point 61 toward the welding torch 1).

In the present embodiment, the water returning flow path 7 is also provided with a pressure measurer 72 (additional pressure measurer). The pressure measurer 72 is a pressure gauge for measuring the pressure inside the water returning flow path 7 and located upstream from the merging point 71 of the water returning flow path 7 (i.e., offset from the merging point 71 toward the welding torch 1).

The controller 5 controls the operation of the cooling water circulator 4 or the valve 81 based on the measured values at the pressure measurers 62 and 72. Specifically, when the measured value at the pressure measurer 62 exceeds a first reference value, the controller 5 switches the valve 81 from the closed state to the open state to open the valve 81. Also, when the measured value at the pressure measurer 62 or the measured value at the pressure measurer 72 falls below a second reference value smaller than the first reference value, the controller 5 stops the operation of the cooling water circulator 4.

In the welding torch 1 according to the present embodiment, when the torch head 20 and the torch body 30 are connected to each other, the first inlet/outlet 23 and the second inlet/outlet 24 of the torch head 20 communicate with the first connection port 32 and the second connection port 33 of the torch body 30, respectively, as shown in FIG. 3. This allows the cooling water pumped out of the cooling water circulator 4 to pass through the welding torch 1 by flowing in the first torch-head flow path 21, the torch-body flow path 31 and the second torch-head flow path 22 in the mentioned order.

On the other hand, when the torch head 20 and the torch body 30 are separated from each other, the first inlet/outlet 23 and the second inlet/outlet 24 of the torch head 20 are closed with the movable part 25, as shown in FIG. 4. With such an arrangement, when the torch head 20 and the torch body 30 are separated, water is stopped at the respective tips of the first torch-head flow path 21 and the second torch-head flow path 22 (the first inlet/outlet 23 and the second inlet/outlet 24), so that cooling water is prevented from leaking through the tip of the torch head 20. This enhances the efficiency of the work for replacing the torch body 30, for example.

The first inlet/outlet 23 and the second inlet/outlet 24 of the torch head 20 are spaced apart from each other by a predetermined distance in the axial direction of the torch head 20 and each have an annular shape around the axis of the torch head. The first connection port 32 and the second connection port 33 of the torch body 30 are spaced apart from each other by the predetermined distance described above in the axial direction of the torch body 30 and each have an arcuate shape around the axis of the torch body. With such a configuration, the first connection port 32 and the second connection port 33 are at positions corresponding to the first inlet/outlet 23 and the second inlet/outlet 24, respectively, in the axial direction. Thus, when the torch head 20 and the torch body 30 are connected, the first inlet/outlet 23 and the second inlet/outlet 24 communicate with the first connection port 32 and the second connection port 33, respectively, regardless of the relative position between the torch head 20 and the torch body 30 around the axial direction.

In the present embodiment, the torch head 20 has a biasing member 26, and the biasing member 26 applies a biasing force to the movable part 25 while being in contact with the movable part 25. The movable part 25 is at a position (first position) pushed deep into the torch head 20 by the tip of the torch body 30 against the biasing force of the biasing member 26 when the torch head 20 and the torch body 30 are connected, while being at a position (second position) displaced toward the tip of the torch head 20 when the torch head 20 and the torch body 30 are separated. With such a configuration, when the torch body 30 is separated from the torch head 20, the first inlet/outlet 23 and the second inlet/outlet 24 are properly closed with the movable part 25. Thus, improved water stopping performance at the tip of the torch head 20 when the torch head 20 and the torch body 30 are separated is reliably achieved.

In the welding torch cooling system A1 of the present embodiment, when the measured value at the pressure measurer 62 provided in the water feeding flow path 6 exceeds the first reference value, the valve 81 of the bypass flow path 8 is opened by the controller 5. When the torch body 30 is separated from the torch head 20, the first inlet/outlet 23 and the second inlet/outlet 24 are closed, so that the pressure in the water feeding flow path 6 increases. When the pressure in the water feeding flow path 6 exceeds a predetermined value, the valve 81 is opened, causing the cooling water to circulate between the bypass flow path 8 and the cooling water circulator 4. When the torch head 20 and the torch body 30 are connected, cooling water flows in the welding torch 1, so that the pressure in the water feeding flow path 6 reduces and the valve 81 is closed. Thus, the cooing water circulates between the welding torch 1 and the cooling water circulator 4.

With such a configuration, when the torch head 20 and the torch body 30 are separated, leakage of cooling water from the welding torch 1 (torch head 20) is avoided, and the flow path of the cooling water is automatically switched to the bypass flow path 8. Thus, the work for replacing the torch body 30, for example, can be performed without the need for on-off switching the cooling water circulator 4, which leads to improved work efficiency.

Note that, unlike the present embodiment, the system may be configured such that the controller 5 stops the operation of the cooling water circulator 4 when the measured value at the pressure measurer 62 exceeds the first reference value. In this case, when the torch body 30 is separated from the torch head 20, the pressure in the water feeding flow path 6 increases due to the closing of the first inlet/outlet 23 and the second inlet/outlet 24, so that the cooling water circulator 4 stops automatically.

In the present embodiment, when the measured value at the pressure measurer 62 provided in the water feeding flow path 6 or the measured value at the pressure measurer 72 provided in the water returning flow path 7 falls below the second reference value (the second reference value<the first reference value), the controller 5 stops the operation of the cooling water circulator 4. With such a configuration, when cooling water circulates between the welding torch 1 and the cooling water circulator 4, the cooling water circulator 4 automatically stops if more than a predetermined amount of cooling water leaks from the water feeding flow path 6, the welding torch 1 or the water returning flow path 7. Thus, excessive leakage of the cooling water is prevented, so that a failure due to insufficient cooling of the welding torch 1 is avoided in advance.

Though the embodiments of the present disclosure are described, the scope of the present disclosure is not limited to the foregoing embodiments.

The present disclosure includes embodiments according to the following clauses:

Clause 1.

A welding torch comprising:

a torch head; and a torch body removably connected to the torch head, wherein:

the torch head includes a first torch-head flow path and a second torch-head flow path for flowing cooling water, a first inlet/outlet and a second inlet/outlet communicating with the first torch-head flow path and the second torch-head flow path, respectively, and a movable part that is movable in an axial direction of the torch head, the torch body includes a torch-body flow path for flowing cooling water, and a first connection port and a second connection port communicating with opposite ends of the torch-body flow path, respectively, the first inlet/outlet and the second inlet/outlet communicate with the first connection port and the second connection port, respectively, when the torch head and the torch body are connected to each other, and the first inlet/outlet and the second inlet/outlet are closed with the movable part when the torch head and the torch body are separated.

Clause 2.

The welding torch according to clause 1, wherein:

the first inlet/outlet and the second inlet/outlet are spaced apart from each other by a predetermined distance in the axial direction of the torch head, each of the first inlet/outlet and the second inlet/outlet having an annular shape around the axis of the torch head, and the first connection port and the second connection port are spaced apart from each other by the predetermined distance in an axial direction of the torch body, each of the first connection port and the second connection port having an arcuate shape around the axis of the torch body.

Clause 3.

The welding torch according to clause 1 or 2, wherein:

the torch head has a biasing member that applies a biasing force to the movable part in the axial direction of the torch head while being in contact with the movable part, the movable part is movable between a first position and a second position, at the first position of the movable part, the movable part is pushed deep into the torch head by a tip of the torch body against a biasing force of the biasing member when the torch head and the torch body are connected, and at the second position of the movable part, the movable part is displaced toward the tip of the torch head by the biasing force of the biasing member when the torch head and the torch body are separated.

Clause 4.

A welding torch cooling system comprising:

a welding torch as set forth in any of the clauses 1-3;

a cooling water circulator for circulating cooling water through the welding torch;

a water feeding f low path having an upstream end connected to the cooling water circulator and a downstream end connected to the first torch-head flow path;

a water returning flow path having an upstream end connected to the second torch-head flow path and a downstream end connected to the cooling water circulator;

a bypass flow path having a first end and a second end, the first end being connected to a branching point of the water feeding flow path while the second end being connected to a merging point of the water returning flow path;

a valve provided in the bypass flow path, the valve being switchable between an on open state and a closed state;

a pressure measurer provided in the water feeding flow path at a position downstream of the branching point; and a controller that controls operation of at least one of the cooling water circulator and the valve based on a measured value at the pressure measurer.

Clause 5.

The welding torch cooling system according to clause 4, wherein the controller opens the valve when the measured value at the pressure measurer exceeds a first reference value.

Clause 6.

The welding torch cooling system according to clause 5, further comprising an additional pressure measurer provided in the water returning flow path at a position upstream of the merging point, wherein the controller stops operation of the cooling water circulator when a measured value at the pressure measurer or a measured value at the additional pressure measurer falls below a second reference value that is smaller than the first reference value.

The invention claimed is:

1. A welding torch comprising:
a torch head; and
a torch body removably connected to the torch head, wherein:
the torch head includes a first torch-head flow path and a second torch-head flow path for flowing cooling water, a first inlet/outlet and a second inlet/outlet communicating with the first torch-head flow path and the second torch-head flow path, respectively, and a movable part that is movable in an axial direction of the torch head,
the torch body includes a torch-body flow path for flowing cooling water, and a first connection port and a second connection port communicating with opposite ends of the torch-body flow path, respectively,
the first inlet/outlet and the second inlet/outlet communicate with the first connection port and the second connection port, respectively, when the torch head and the torch body are connected to each other, and
the first inlet/outlet and the second inlet/outlet are closed with the movable part when the torch head and the torch body are separated, thereby stopping the flow of the cooling water at the first inlet/outlet and the second inlet/outlet.

2. The welding torch according to claim 1, wherein:
the first inlet/outlet and the second inlet/outlet are spaced apart from each other by a predetermined distance in the axial direction of the torch head, each of the first inlet/outlet and the second inlet/outlet having an annular shape around the axis of the torch head, and
the first connection port and the second connection port are spaced apart from each other by the predetermined distance in an axial direction of the torch body, each of the first connection port and the second connection port having an arcuate shape around the axis of the torch body.

3. The welding torch according to claim 1, wherein:
the torch head comprises a biasing member that applies a biasing force to the movable part in the axial direction of the torch head while being in contact with the movable part,
the movable part is movable between a first position and a second position,
at the first position of the movable part, the movable part is pushed deep into the torch head by a tip of the torch body against a biasing force of the biasing member when the torch head and the torch body are connected, and
at the second position of the movable part, the movable part is displaced toward the tip of the torch head by the biasing force of the biasing member when the torch head and the torch body are separated.

4. The welding torch according to claim 1, wherein the torch head includes a central axis;
the movable part is movable in a direction parallel to the central axis between a first position closing both the first inlet/outlet and the second inlet/outlet and a second position where both the first inlet/outlet and the second inlet/outlet are not closed by the movable part; and a biasing spring in the torch head, the biasing spring is engaged with the movable part and resiliently biases the movable part toward the first position.

5. A welding torch cooling system comprising:
a welding torch comprising:
a torch head; and
a torch body removably connected to the torch head, wherein:
the torch head includes a first torch-head flow path and a second torch-head flow path for flowing cooling water, a first inlet/outlet and a second inlet/outlet communicating with the first torch-head flow path and the second torch-head flow path, respectively, and a movable part that is movable in an axial direction of the torch head,
the torch body includes a torch-body flow path for flowing cooling water, and a first connection port and a second connection port communicating with opposite ends of the torch-body flow path, respectively,
the first inlet/outlet and the second inlet/outlet communicate with the first connection port and the second connection port, respectively, when the torch head and the torch body are connected to each other, and
the first inlet/outlet and the second inlet/outlet are closed with the movable part when the torch head and the torch body are separated;
a cooling water circulator for circulating cooling water through the welding torch;
a water feeding flow path having an upstream end connected to the cooling water circulator and a downstream end connected to the first torch-head flow path;
a water returning flow path having an upstream end connected to the second torch-head flow path and a downstream end connected to the cooling water circulator;
a bypass flow path having a first end and a second end, the first end being connected to a branching point of the water feeding flow path while the second end being connected to a merging point of the water returning flow path;
a valve provided in the bypass flow path, the valve being switchable between an on open state and a closed state;
a pressure measurer provided in the water feeding flow path at a position downstream of the branching point; and
a controller that controls operation of at least one of the cooling water circulator and the valve based on a measured value at the pressure measurer.

6. The welding torch cooling system according to claim 5, wherein the controller opens the valve when the measured value at the pressure measurer exceeds a first reference value.

7. The welding torch cooling system according to claim 6, further comprising an additional pressure measurer provided in the water returning flow path at a position upstream of the merging point,
wherein the controller stops operation of the cooling water circulator when a measured value at the pressure measurer or a measured value at the additional pressure measurer falls below a second reference value that is smaller than the first reference value.

* * * * *